United States Patent [19]

McClelland et al.

[11] Patent Number: 5,231,841
[45] Date of Patent: Aug. 3, 1993

[54] REFRIGERANT CHARGING SYSTEM AND CONTROL SYSTEM THEREFOR

[76] Inventors: Ralph A. McClelland, 9546 Hardway Dr., Indianapolis, Ind. 46256; John P. Hancock, 11783 Garden Cir. East, Fishers, Ind. 46038; Daniel B. White, 7420 Railway Ct., Indianapolis, Ind. 46256

[21] Appl. No.: 810,697

[22] Filed: Dec. 19, 1991

[51] Int. Cl.⁵ .............................................. F25B 45/00
[52] U.S. Cl. ........................................ 62/77; 62/149; 62/125; 62/292
[58] Field of Search .................. 62/77, 125, 129, 149, 62/292

[56] References Cited

U.S. PATENT DOCUMENTS

| | | |
|---|---|---|
| Re. 32,451 | 7/1987 | Proctor . |
| Re. 33,212 | 5/1990 | Lower . |
| 1,938,205 | 12/1933 | Yeomans . |
| 2,044,096 | 6/1936 | Moran . |
| 2,321,964 | 6/1943 | Zicher . |
| 2,341,429 | 2/1944 | Elsey . |
| 2,341,430 | 2/1944 | Elsey . |
| 2,577,598 | 12/1951 | Zwickle . |
| 2,590,061 | 3/1952 | Ash . |
| 2,865,442 | 12/1958 | Halford . |
| 2,917,110 | 12/1959 | Brohl . |
| 2,972,235 | 2/1961 | Smith . |
| 2,986,894 | 6/1961 | Endress . |
| 3,131,548 | 5/1964 | Chubb et al. . |
| 3,177,680 | 4/1965 | Rasovich et al. . |
| 3,232,070 | 2/1966 | Sparano . |
| 3,357,197 | 12/1967 | Massengale . |
| 3,400,552 | 9/1968 | Johnson et al. . |
| 3,478,529 | 11/1969 | Boykin . |
| 3,695,055 | 10/1972 | Bruce . |
| 3,729,949 | 5/1973 | Talbot . |
| 3,872,687 | 3/1975 | Bottum et al. . |
| 3,873,289 | 3/1975 | White . |
| 3,875,755 | 4/1975 | Anderson et al. . |
| 3,915,857 | 10/1975 | Olson . |
| 4,106,306 | 8/1978 | Saunders . |
| 4,110,998 | 9/1978 | Owen . |
| 4,114,448 | 9/1978 | Merritt . |
| 4,175,398 | 11/1979 | Edwards et al. . |
| 4,236,381 | 12/1980 | Imral et al. . |

(List continued on next page.)

FOREIGN PATENT DOCUMENTS

| | | |
|---|---|---|
| 0071062 | 2/1983 | European Pat. Off. . |
| 0313079 | 4/1989 | European Pat. Off. . |
| 2056646A | 3/1981 | United Kingdom . |

Primary Examiner—John M. Sollecito

[57] ABSTRACT

An apparatus and method for controlling the charging of refrigerant into a refrigerant system is disclosed. The apparatus determines the mass amount of refrigerant charged by determining the volume of refrigerant charged, the density of the refrigerant based on its pressure as it is charged, and determines the mass amount charged from the determined density and pressure. The apparatus has a pressure compensated flow valve and determines the volume of refrigerant charged based on the amount of time refrigerant has flowed through the constant flow valve. The type of refrigerant being charged can be selected from a plurality of refrigerant types and the apparatus has a memory in which data related to density and flow characteristics of each refrigerant type is stored. The apparatus uses the data for the selected refrigerant to determine the mass amount of refrigerant charged. The apparatus further determines that the refrigerant supply tank is empty when its pressure decay exceeds a predetermined amount. The apparatus has a manifold in which the constant flow valve is mounted and the apparatus can be made as a portable, hand carried unit. The apparatus can also be used as a mass flowmeter.

33 Claims, 14 Drawing Sheets

U.S. PATENT DOCUMENTS

| | | |
|---|---|---|
| 4,245,480 | 1/1981 | Saunders . |
| 4,261,178 | 4/1981 | Cain . |
| 4,285,206 | 8/1981 | Koser . |
| 4,304,102 | 12/1981 | Gray . |
| 4,325,223 | 4/1982 | Cantley . |
| 4,363,222 | 12/1982 | Cain . |
| 4,364,236 | 12/1982 | Lower . |
| 4,381,549 | 4/1983 | Stamp, Jr. et al. . |
| 4,441,330 | 4/1984 | Lower . |
| 4,456,149 | 6/1984 | Sciortino . |
| 4,470,265 | 9/1984 | Correia . |
| 4,476,688 | 10/1984 | Goddard . |
| 4,480,446 | 11/1984 | Margulefsky . |
| 4,484,452 | 11/1984 | Houser, Jr. . |
| 4,513,578 | 4/1985 | Proctor . |
| 4,523,897 | 6/1985 | Lower . |
| 4,539,817 | 9/1985 | Staggs . |
| 4,554,792 | 11/1985 | Margulefsky . |
| 4,614,231 | 9/1986 | Proctor . |
| 4,624,112 | 11/1986 | Proctor . |
| 4,646,527 | 3/1987 | Taylor . |
| 4,688,388 | 8/1987 | Lower . |
| 4,700,549 | 10/1987 | Biasini . |
| 4,755,957 | 7/1988 | White et al. . |
| 4,768,347 | 9/1988 | Manz . |
| 4,776,733 | 8/1988 | Scuderi . |
| 4,798,055 | 1/1989 | Murray . |
| 4,805,416 | 2/1989 | Manz . |
| 4,809,520 | 3/1989 | Manz . |
| 4,856,288 | 8/1989 | Weber . |
| 4,862,699 | 9/1989 | Tounis . |
| 4,878,356 | 11/1989 | Punches . |
| 4,909,042 | 3/1990 | Proctor . |
| 4,916,915 | 4/1990 | Flinchbaugh . |
| 4,938,031 | 7/1990 | Manz . |
| 4,939,905 | 7/1990 | Manz . |
| 4,942,741 | 7/1990 | Hancock et al. . |
| 4,967,567 | 11/1990 | Proctor et al. . |
| 4,969,495 | 11/1990 | Grant . |
| 4,982,576 | 1/1991 | Proctor et al. . |
| 5,005,375 | 4/1991 | Manz et al. . |
| 5,046,322 | 9/1991 | Bulla et al. . |
| 5,146,761 | 9/1992 | Cavanaugh et al. ............... 62/149 |
| 5,161,385 | 11/1992 | Schumacher ..................... 62/149 |

REFRIGERANT CHARGING SYSTEM AND CONTROL SYSTEM THEREFOR

BACKGROUND AND SUMMARY OF THE INVENTION

This invention relates to refrigerant charging systems, and more particularly, to a control system for controlling the charging of refrigerant into a refrigerant system.

In the past, a number of charging systems and techniques have been used to charge refrigerant into refrigerant systems, such as cooling systems. These systems can be as simple as a set of hoses and gauges which are used to connect a tank of pressurized refrigerant to the refrigerant system. Refrigerant is then charged into the refrigerant system until a desired pressure is reached. Outside the automotive industry, the use of hose and gauge sets is perhaps the most common way of charging refrigerant into refrigerant systems.

In the automotive industry, a number of systems have been used to charge refrigerant into refrigerant systems, i.e., the air conditioning systems on the automobiles, including the hose and gauge sets. While the hose and gauge sets are truly portable in the sense that they can be picked up and carried from job to job by hand, more complex systems are portable only in the sense that they are built in carts that can be wheeled from job to job.

One such refrigerant charging system that has been used in the past is described in U.S. Pat. No. 3,873,289 for an Air Conditioner Servicing United to Kenneth R. White, the president of K-Whit Tools, Inc, the owner of this application. The apparatus disclosed in the '289 patent charges refrigerant through a pressure compensated constant flow valve and controls the amount of refrigerant charged into the refrigerant system by a timer. In this manner, the charging system disclosed in the '289 patent achieves the desirable objective of accurately controlling the amount of refrigerant charged into the refrigerant system being charged.

While the system disclosed in the '289 patent has been successfully marketed for many years by the assignee of this application, one problem that it has is that the mass of refrigerant which flows through the constant flow valve in a given unit of time will vary from refrigerant type to refrigerant type. Moreover, it will also vary with pressure which in turn varies with temperature. Controlling the mass of refrigerant charged and being able to determine the mass of refrigerant charged is desirable since mass or weight is typically used both for inventory purposes and for determining the cost of the recharging service.

In addition to being able to accurately determine the mass of refrigerant charged into a refrigerant system, it is also desirable to be able to charge a given amount of refrigerant into a refrigerant system. Often, when recharging a refrigerant system, the service technician will take appropriate measurements, such as inlet and outlet pressures, and determine the amount of refrigerant that needs to be recharged into the system. Alternatively, the service technician may choose to charge the refrigerant system to a given pressure in which case it is important that the service technician be able to determine the amount of refrigerant charged into the system for the reasons discussed previously.

Another problem with systems of the type described in the '289 patent is that they are only "semi" portable. They are mounted in carts and while they can be rolled from job to job in a confined area, such as in an automotive repair garage, they cannot be easily moved from site to site such as is required to service home and commercial refrigerant systems. For this reason, hose and gauge sets are still the system of choice in servicing refrigerant systems outside the automotive industry. However, hose and gauge sets are manual systems which rely solely upon the judgement of the service technician to determine when the refrigerant system has been adequately charged. Moreover, they do not provide for a way of determining the amount of refrigerant charged into a system, although sometimes scales are used with hose and gauge sets to determine this.

It is an object of this invention to provide a control system for controlling the charging of refrigerant into a refrigerant system that has a constant flow valve and determines the mass of refrigerant charged based on the volume of refrigerant that has flowed through the valve, the refrigerant type, and the pressure of the refrigerant being charged into the refrigerant system.

It is also an object of this invention to provide a control system for controlling the charging of refrigerant into a refrigerant system that allows the service technician to preset the amount of refrigerant to be charged into the refrigerant system and which will then charge that amount of refrigerant into the refrigerant system.

It is also an object of this invention to provide a truly portable, i.e., hand carried, control system for controlling the charging of refrigerant into a refrigerant system.

It is also an object of this invention to provide a mass flowmeter for gaseous fluids which a constant flow valve throught which the gaseous fluid flows and which determines the mass amount of gaseous fluid based on the volume of gaseous fluid that has flowed through the constant flow valve and the density of the gaseous fluid as determined by the pressure of the gasous fluid at the outlet of the constant flow valve and data related to the density characteristics of the gaseous fluid.

SUMMARY OF THE INVENTION

An apparatus and method for controlling the charging of refrigerant into a refrigerant system determines the mass amount of refrigerant charged into the refrigerant system by determining the volume of refrigerant charged into the refrigerant system, determining the density of the refrigerant based on its pressure as it is charged into the refrigerant system, and determining the mass amount of refrigerant charged into the refrigerant system based on the volume and density of the refrigerant. The apparatus preferably has a pressure compensated constant flow valve and determines the volume amount of refrigerant based on the amount of time refrigerant has flowed through the constant flow valve and flow characteristics of the refrigerant. The apparatus preferably includes means for selecting the particular type of refrigerant to be charged into the refrigerant system from different types of refrigerants. The apparatus stores in a memory data related to density and flow characteristics of each of the refrigerant types and uses the data for the selected refrigerant type when determining the density and volume of refrigerant. Also, the apparatus preferably provides for two different types of charging modes, charge to a set amount and charge to pressure. In the charge to set amount, the amount of refrigerant to be charged into the refrigerant system can be preset and the apparatus will stop the charging of refrigerant into the refrigerant system once that set amount is reached and display on a display the amount of refrigerant charged. In the charge to pressure mode, the apparatus will continuously charge until stopped. The apparatus monitors and displays the pressure of refrigerant in the refrigerant system so that a technician can stop the charging process once the desired pressure is reached. The apparatus will also continuously determine and display the mass amount of refrigerant charged. The apparatus also preferably monitors both the high and low pressure sides of the refrigerant systems and displays these pressure in either pressure units or temperature units.

An apparatus and method of controlling the charging refrigerant from a tank of pressurized refrigerant into a system according to this invention monitors the pressure in the pressurized tank. When the rate of pressure decay in the pressurized tank, i.e., the rate at which pressure in the tank is dropping, reaches a predetermined amount, the refrigerant tank is determined to be empty and the charging process is terminated.

A portable, hand carried, apparatus for controlling the charging of refrigerant into a refrigerant system has a manifold to which is mounted a constant flow valve in series between an inlet and an outlet of the manifold. When in use, the manifold inlet is coupled to a source of refrigerant and the manifold outlet is coupled to the refrigerant system. A solenoid valve is mounted to the manifold in series with the constant flow valve between the manifold inlet and outlet. A controller energizes and deenergizes the solenoid valve to open and close it to permit refrigerant to flow through the apparatus into the refrigerant system to charge refrigerant into it and to close the solenoid valve to stop the charging process. The manifold can also be provided with pressure transducer ports to which are mounted pressure transducers. The pressure transducers are coupled to the controller which can then determine the pressures of the refrigerant at the manifold inlet and outlet therefrom.

A mass flowmeter for gaseous fluids has a constant flow valve through which the gaseous fluid flows. The mass amount of gaseous fluid that has flowed through the mass flowmeter is determined by determining the volume of gaseous fluid that has flowed through the mass flowmeter, determining the pressure of the gaseous fluid at the outlet of the constant flow valve and determining the density of the gaseous fluid based on the determined pressure and data related to the density characteristics of the gaseous fluid, the mass amount of gaseous fluid that has flowed through the constant flow valve, and thus through the flowmeter, being determined based on the determined volume and density of the gaseous fluid.

Additional features and advantages of the invention will become apparent to those skilled in the art upon consideration of the following detailed description of a preferred embodiment, exemplifying the best mode of carrying out the invention as presently perceived. The detailed description particularly refers to the accompanying figures in which:

DETAILED DESCRIPTION OF THE DRAWINGS

While the invention described below is discussed in the context of a control system for charging refrigerant into a refrigerant system, the apparatus and method described can also be used for other gaseous fluids. Thus, the apparatus and method described can be utilized as a mass flowmeter for gaseous fluids using the techniques discussed herein.

Figure 1:
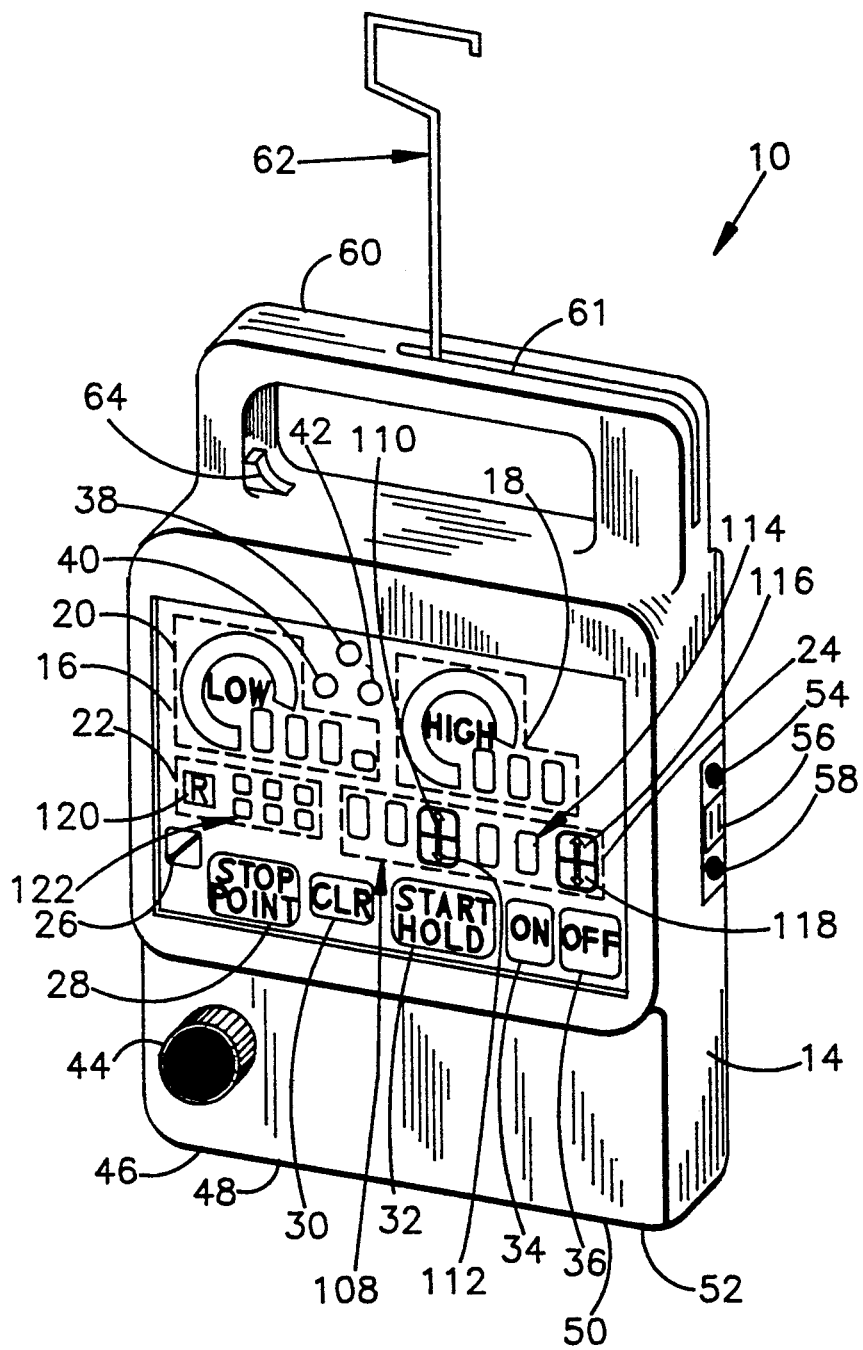
FIG. 1 is a perspective view of a control system in accordance with this invention.

Referring to FIG. 1, a control system 10 for controlling the charging of refrigerant into a refrigerant system 12 (FIG. 2) is shown. Control system 10 has a case 14 in which is mounted a keyboard/display 16 which extends through a top surface of case 14. Keyboard display 16 includes a high pressure display 18, a low pressure display 20, a refrigerant selector/display 22, charge amount keys/display 24, temperature/pressure mode selector key 26, stop point key 28, clear key 30, start-/hold key 32, on key 34, off key 36, and low battery error indicator 38, out-of-refrigerant error indicator 40, and insufficient pressure drop error indicator 42. A knob 44, which is used to actuate shut-off valve 72 (FIG. 2), is mounted to shaft 73 (FIG. 3) of shut-off valve 72 which extends up from the top surface of case 14. A low pressure port coupling 46, a vacuum/recovery port coupling 48, a refrigerant supply port coupling 50 and a high pressure port coupling 52 extend through the lower side, as oriented in FIG. 1, of case 14. A battery charge light emitting diode (LED) 54, a power jack 56 and a temperature probe jack 58 are mounted in the right side, as oriented in FIG. 1, of case 14.

Case 14 has a handle 60 in which a hook 62 and a hook release lever 64 are mounted. Handle 60 has a slot 61 into which hook 62 can be received and secured by a conventional catch (not shown). Hook release lever 64 is depressed to release hook 62 so that it can be drawn out of slot 61 in handle 60 for use in hanging case 14.

Refrigerant selector/display 22 includes a refrigerant selector key 120 and refrigerant type displays 122. Charge amount keys/display 24 include pounds display 108, up and down pound increment keys 110, 112, respectively, ounces display 114, and up and down ounces increment keys 116, 118, respectively.

Figure 2:
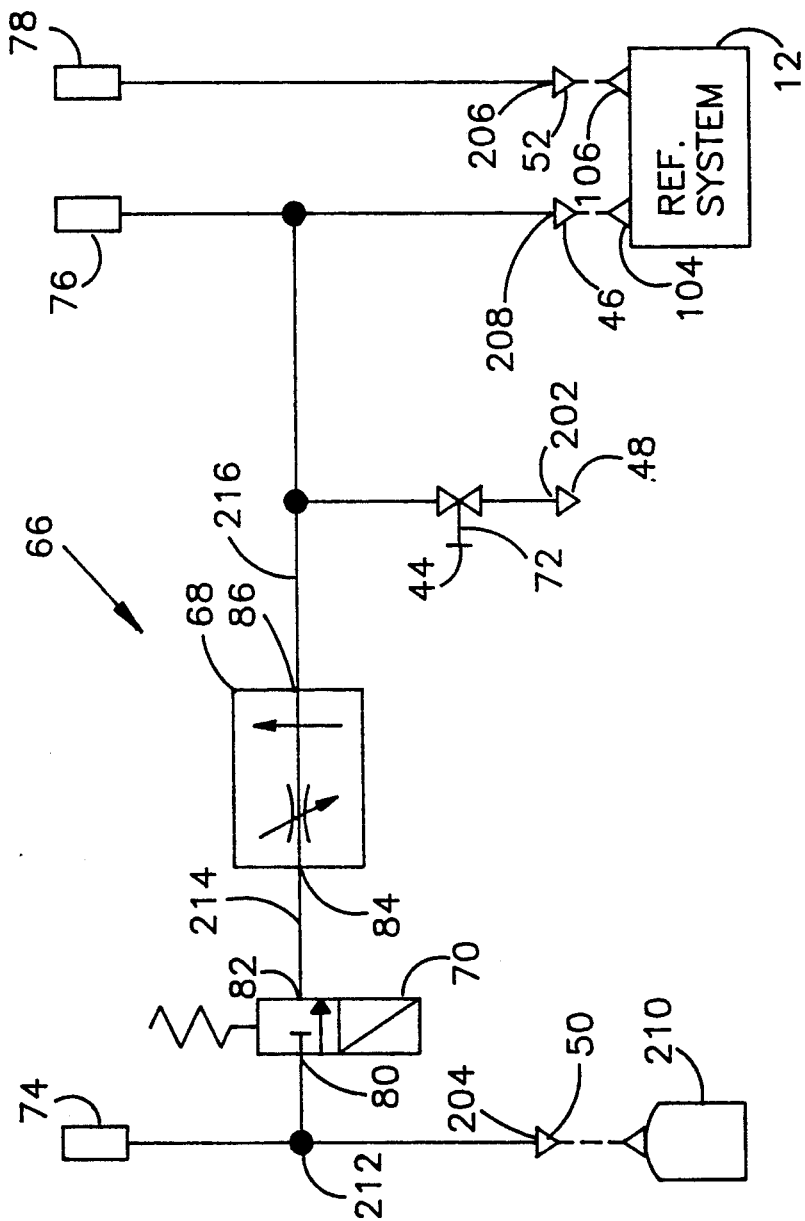
FIG. 2 is a schematic of the fluid flow circuit of the control system of FIG. 1.

Referring to FIG. 2, control system 10 has a flow control circuit 66 through which refrigerant flows.

Figure 3B:
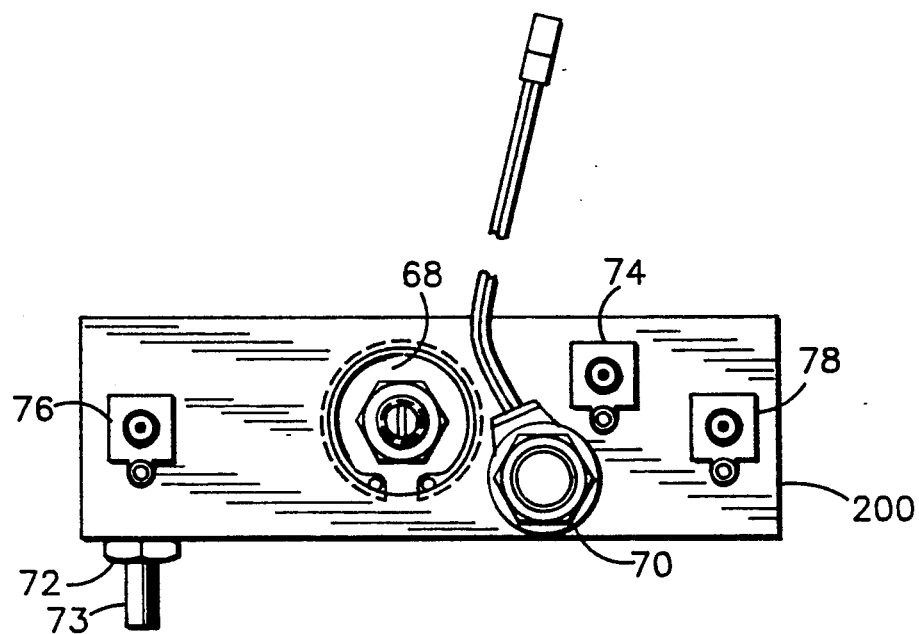
FIGS. 3A and 3B are top and side perspective views, respectively, of a manifold in which the fluid flow circuit of FIG. 2 is implemented.
Figure 3A:
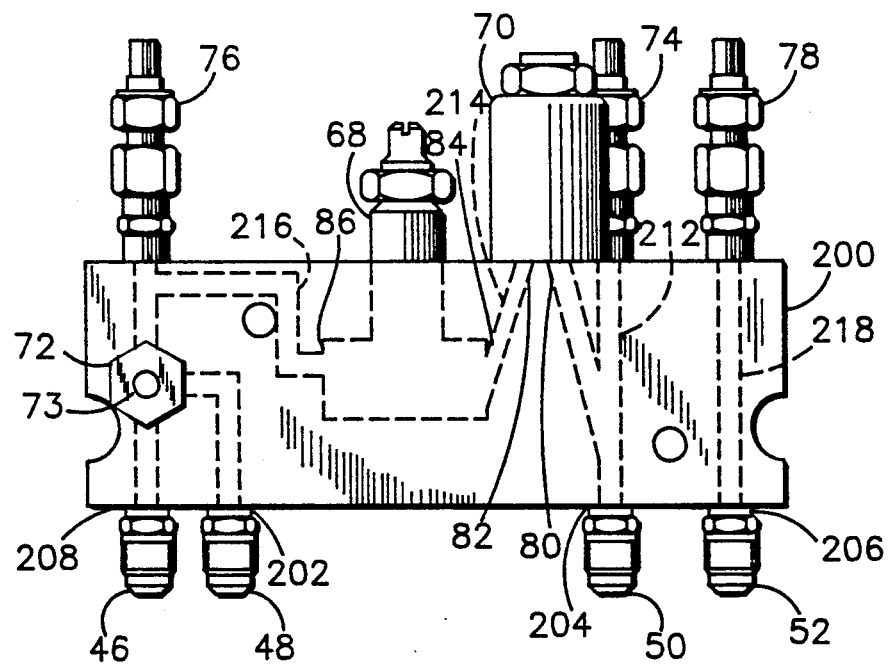

Flow control circuit 66 is preferably implemented by use of a manifold 200 (FIGS. 3A and 3B), which is mounted in case 14 of control system 10. Referring to FIGS. 2, 3A and 3B, flow control circuit 66, as implemented in manifold 200, has a vacuum recovery port 202 to which is coupled vacuum/recovery port coupling 48, a refrigerant supply port 204 to which is coupled refrigerant supply port coupling 50, a high pressure port 206 to which is coupled high pressure port coupling 52, and a low pressure port 208 to which is coupled low pressure port coupling 46. Flow control circuit 66 also includes a constant flow valve 68, a solenoid valve 70, shut-off valve 72, a tank pressure transducer 74, a low side pressure transducer 76, and a high side pressure transducer 78.

Solenoid valve 70 is mounted in manifold 200 and has an inlet 80 coupled by a passageway 212 in manifold 200 to refrigerant supply port 204. A tank pressure transducer 74 is also mounted in manifold 200 and is coupled by passageway 212 in manifold 200 to refrigerant supply port 204. An outlet 82 of solenoid valve 70 is coupled by a passageway 214 in manifold 200 to an inlet 84 of constant flow valve 68. Constant flow valve 68 is also mounted in manifold 200. An outlet 86 of constant flow valve 68 is coupled by a passageway 216 in manifold 200 to low pressure port 208 and through shut-off valve 72 to vacuum/recovery port 202. Shut-off valve 72 is mounted in manifold 200 in series between vacuum/recovery port 202 and low pressure port 208 and has shaft 73 extending upwardly therefrom. When manifold 200 is mounted in case 14 of control system 10, shaft 73 extends through the top surface of case 14 of control system 10 and knob 44 is affixed to shaft 73. Low side pressure transducer 76 is alos coupled by passageway 216 to low pressure port 208. High side pressure transducer 78 is coupled by a passageway 218 in manifold 200 to high pressure port 206.

Figure 4:
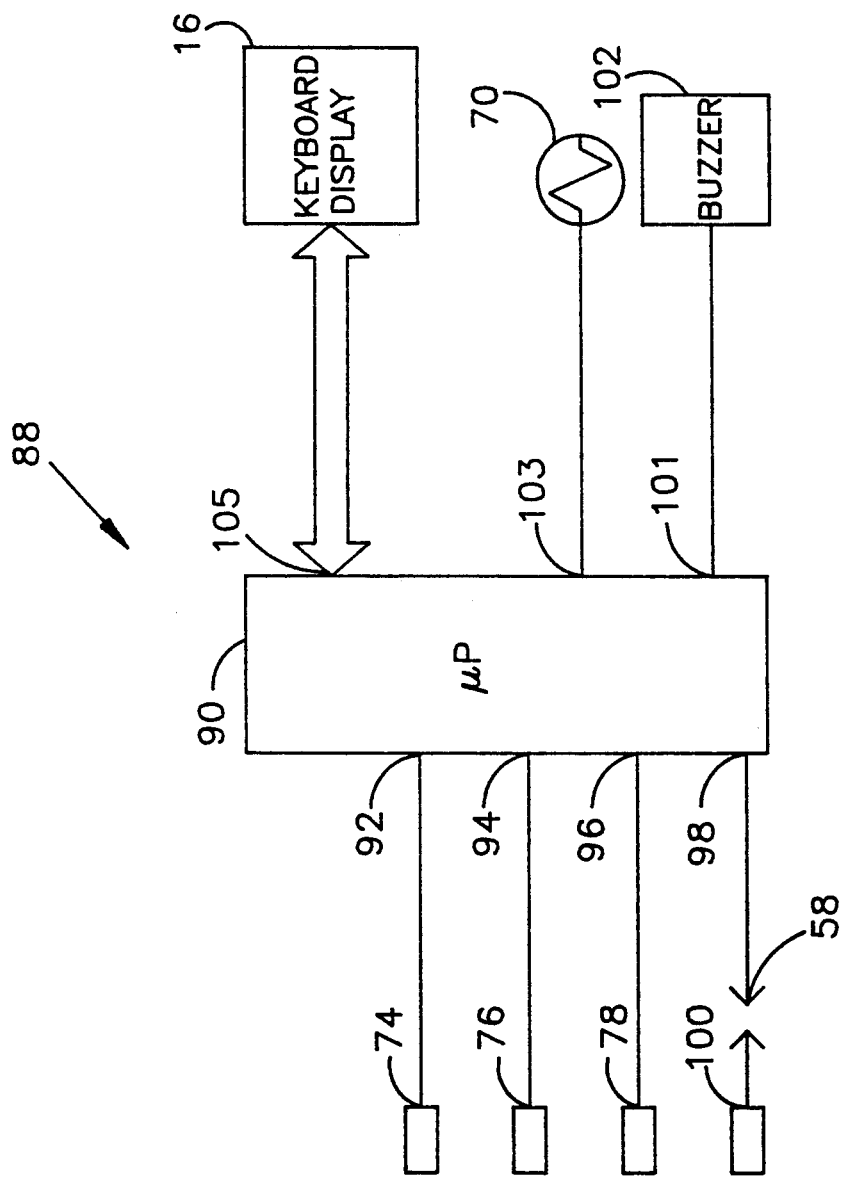
FIG. 4 is a block diagram of the electronic circuit of the control system of FIG. 1.

Referring to FIG. 4, control system 10 has an electronic control circuit 88. Electronic control circuit 88 includes a microcontroller 90 which has analog inputs 92, 94, 96, 98. Microcontroller 90 is illustratively a MC68HC705B5P microcontroller manufactured by Motorola, Inc., 6501 William Canon Drive West, Austin, Tx. 78735. Analog inputs 92, 94, 96, 98 are internally multiplexed in microcontroller 90 to an analog/digital converter which is part of microcontroller 90 wherein microcontroller 90 can selectively digitize the analog signals at analog inputs 92, 94, 96, 98. Analog input 92 is coupled to tank pressure transducer 74, analog input 94 is coupled to low side pressure transducer 76, analog input 96 is coupled to high side pressure transducer 78, and analog input 98 is coupled to the temperature probe jack 58 into which a temperature probe 100 can be plugged. Microcontroller 90 also has discrete digital outputs 101 and 103 coupled to a buzzer 102 and solenoid valve 70, respectively. Additionally, microcontroller 90 has address/data inputs/outputs 105 coupled to keyboard/display 16.

Referring to FIGS. 1-4, in use the low pressure port coupling 46 is coupled to a low pressure port 104 of refrigerant system 12 thus coupling low pressure port 208 of fluid control circuit 66 to the low pressure port 104 of refrigerant system 12. High pressure port coupling 52 is coupled to a high side port 106 of refrigerant system 12 thus coupling high pressure port 206 of fluid control circuit 66 to the high side port 106 of refrigerant system 12.

The service technician selects the correct refrigerant type by pressing refrigerant selector key 120 of refrigerant selector/display 22 and the selected refrigerant is displayed on refrigerant displays 122 of refrigerant selector/display 22. The service technician now takes the high and low pressures of refrigerant system 12. Low and high pressure transducers 76, 78, generate analog electrical signals which are proportional to the pressures at the low and high side ports 104, 106, of refrigerant system 12. The analog signals generated by low and high pressure transducers 76, 78, are provided to analog inputs 94, 96 of microcontroller 90. Microcontroller 90 digitizes the low and high pressure signals at its analog inputs 94, 96, determines the low and high pressures from the digitized values, and displays the low and high side pressures of refrigerant system 12 on low and high pressure displays 20, 18, respectively. If temperature probe 100 is inserted in temperature probe jack 58, an analog electrical signal indicative of the temperature is provided at analog input 98 of microcontroller 90. Microcontroller 90 digitizes the temperature signal, determines the temperature sensed by temperature probe 100 from the digitized value, and displays it on low pressure display 20. Low pressure display 20 will display the temperature sensed by temperature probe 100 as long as it is plugged into temperature probe jack 58 and temperature probe 100 must be removed from temperature probe jack 58 for microcontroller 90 to display the low pressure on low pressure display 20.

The low and high pressures can also be displayed in degrees as is conventional when dealing with refrigerant systems. To change between displaying the low and high pressures in pounds per square inch and degrees, the service technician toggles temperature/pressure mode selector key 26. When in the temperature mode, microcontroller 90 looks up in a table for the selected refrigerant the temperature values which correspond to the low and high pressures. Illustratively, microcontroller 90 has a table of such values for each refrigerant that can be selected. Alternatively, it could solve the appropriate mathematical equation, selected based on the selected refrigerant, for the temperature values using the pressures values as variables in the equation.

Prior to charging refrigerant into refrigerant system 12, the service technician may purge it first. To do so, the service technician couples vacuum/recovery port coupling 48, and thus vacuum/recovery port 202 of fluid control circuit 66, to a refrigerant recovery system (not shown). Shut-off valve 72 is then opened by turning knob 44. Refrigerant then flows from refrigerant system 12 out of low pressure port 104 of refrigerant system 12 into low pressure port 208 of control system 10, through shut-off valve 72 and out through vacuum/recovery port 202 into the refrigerant recovery system (not shown). After refrigerant system 12 has been purged, knob 44 is turned to close shut-off valve 72.

Control system 10 can also be used to evacuate refrigerant system 12, which would typically take place after it has been purged. Vacuum/recovery port 48 is coupled to a vacuum pump (not shown). The vacuum pump is turned on and knob 44 again turned to open shut-off valve 72 which draws vacuum on the low pressure side of refrigerant system 12. After refrigerant system 12 has been evacuated, knob 44 is turned to close shut-off valve 72, the vacuum pump turned off and disconnected from vacuum/recovery port 48.

To charge refrigerant into refrigerant system 12 with control system 10, refrigerant supply port coupling 50 is coupled to a pressurized refrigerant supply tank 210 which couples refrigerant supply port 204 of fluid control circuit 66 to refrigerant supply tank 210. Refrigerant supply tank 210 contains the type of refrigerant which the service technician previously selected. The service technician now sets control system 10 to either charge to a desired amount of refrigerant or to charge to pressure, i.e., to charge until the service technician determines that a desired pressure is reached at which time the service technician stops the charging. To set control system 10 to charge to a desired amount of refrigerant, stop point key 28 is pressed so that it is illuminated. When stop point key 28 is illuminated, the previously entered stopping point (desired amount of refrigerant) will be displayed on charge amount keys/display 24 by microcontroller 90. The pounds and ounces increment keys 110, 112, 116, 118, of charge amount keys/display 24 are pressed until the desired amount of refrigerant is displayed on pounds and ounces displays 108, 114, of charge amount keys/display 24.

The stop point key 28 can be pressed to turn it off, in which case microcontroller 90 will display the total amount of refrigerant dispensed on charge amount keys/display 24. Prior to charging, this must be cleared by pressing clear key 30.

Charging is started by pressing start/hold key 32. Microcontroller 90 responds to start/hold key 32 being depressed by energizing solenoid valve 70 to open it. Refrigerant will now flow from the refrigerant supply tank 210 into refrigerant supply port 204 through refrigerant port coupling 50, through solenoid valve 70, constant flow valve 68, out of low pressure port 208 and into the low pressure side of refrigerant system 12 through low pressure port coupling 46 and the low pressure port 104 of refrigerant system 12. Assuming the stop point key 28 is not illuminated, microcontroller 90 will display the amount of refrigerant charged into refrigerant system 12 on charge amount keys/display 24. Microcontroller 90 continuously determines the amount of refrigerant that has been charged into refrigerant system 12. Once the desired amount of refrigerant has been charged into refrigerant system 12, microcontroller 90 deenergizes solenoid valve 70, closing it and shutting off the flow of refrigerant through control system 10, and also energizing buzzer 102. Charging can be stopped by pressing start/hold key 32 which will cause microcontroller 90 to deenergize solenoid valve 70 thus shutting it. Again pressing start/hold key 32 causes control system 10 to resume charging.

To charge to pressure, the desired amount of refrigerant is set to zero. The stop point key 28 is pressed to illuminate it and the clear key 30 pressed to set the desired amount of refrigerant to zero. The stop point key 28 is pressed again and the clear key then pressed to reset the amount of refrigerant charged to zero. The start/hold key 32 is then pressed. Microcontroller 90 energizes solenoid valve 70 to open it and refrigerant begins flowing from the refrigerant supply tank 210 through control system 10 into the refrigerant system 12 through its low side port 104. Again, microcontroller 90 continuously determines the amount of refrigerant charged into refrigerant system 12. The amount of refrigerant charged into refrigerant system 12 will be displayed by microcontroller 90 on charge amount keys/display 24 and will display the low and high pressures of refrigerant system 12 on low and high pressure displays 20, 18, respectively. Charging will continue until start/hold key 32 is pressed again, at which time microcontroller 90 will deenergize solenoid valve 70, closing it. The total amount of refrigerant charged into refrigerant system 12 will be displayed by microcontroller 90 on charge amount keys/display 24 which the technician can then record for billing and inventory purposes.

Figure 5:
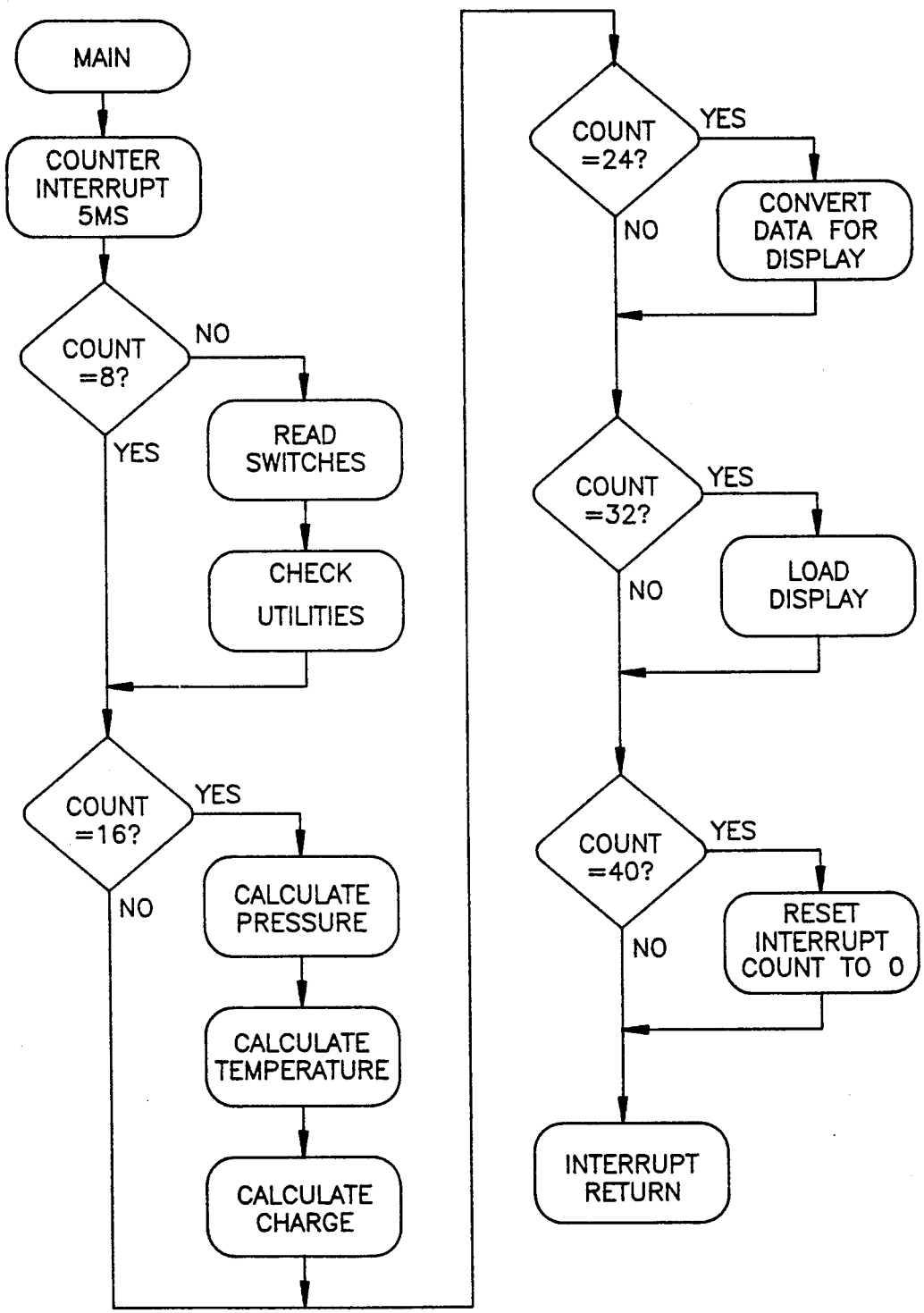
FIG. 5 is a flow chart of a computer program which operates the control system of FIG. 1.

FIGS. 5-11 are flow charts of the program for microcontroller 90. Referring first to FIG. 5, which shows the program flow for the main routine, an internal counter in microcontroller 90 is set to generate an interrupt every five milliseconds. That is, the internal counter counts clock pulses generated by a clock circuit for microcontroller 90 and generates an interrupt after five milliseconds has elapsed. After the internal counter generates an interrupt, an interrupt counter is incremented. As will be seen, the main routine is on a forty interrupt cycle wherein the various subroutines shown in FIG. 5 are executed once every forty interrupts, but at different points in the forty interrupt cycle. The read switches and check utilities subroutines are executed when the interrupt counter is equal to eight. The calculate pressure, calculate temperature and calculate charge subroutines are executed when the interrupt counter is equal to sixteen. The convert data for display subroutine is executed when the interrupt counter is equal to twenty-four. Data is loaded into display/keyboard 16 when the interrupt counter is equal to thirty-two. When the interrupt counter reaches forty, it is reset.

Figure 6:
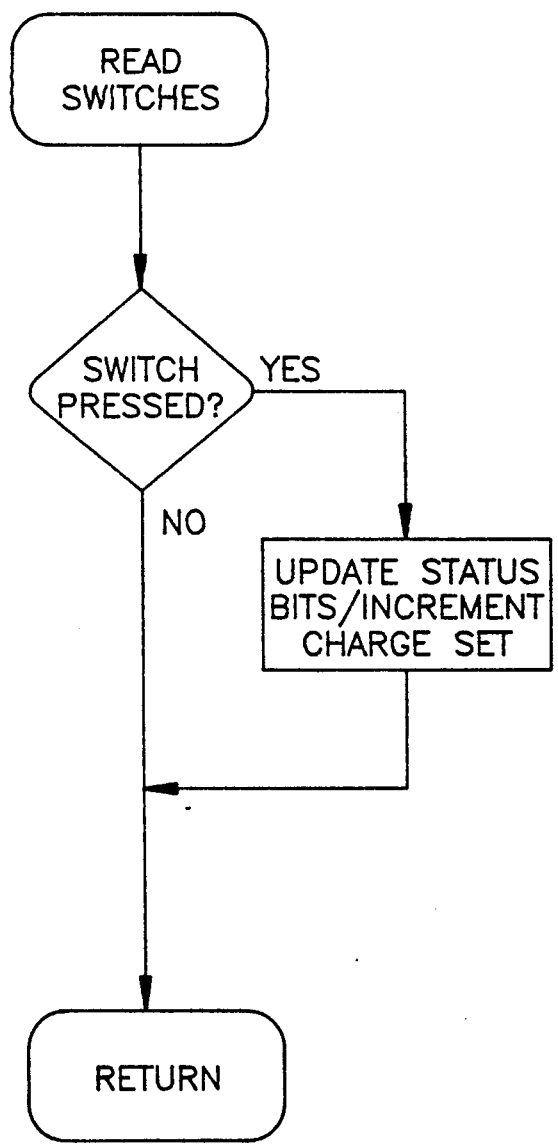
FIG. 6 is a flow chart of the read switches subroutine of the computer program of FIG. 5.

FIG. 6 is a flow chart showing the read switches subroutine. Upon entry to the read switches subroutine, a determination is made as to whether any switch of keyboard/display 16 has been pressed. If not, the read switches routine returns to the main routine. If a switch has been pressed, the appropriate memory in microcontroller 90 is updated. Status bits for the various switches are updated and in the event pounds/ounces keys 110, 112, 116, 118, were pressed, the predetermined amount of refrigerant to be charged into refrigerant system 12 is incremented or decremented, as the case may be. Thereafter, the read switches subroutine returns to the main routine.

Figure 7:
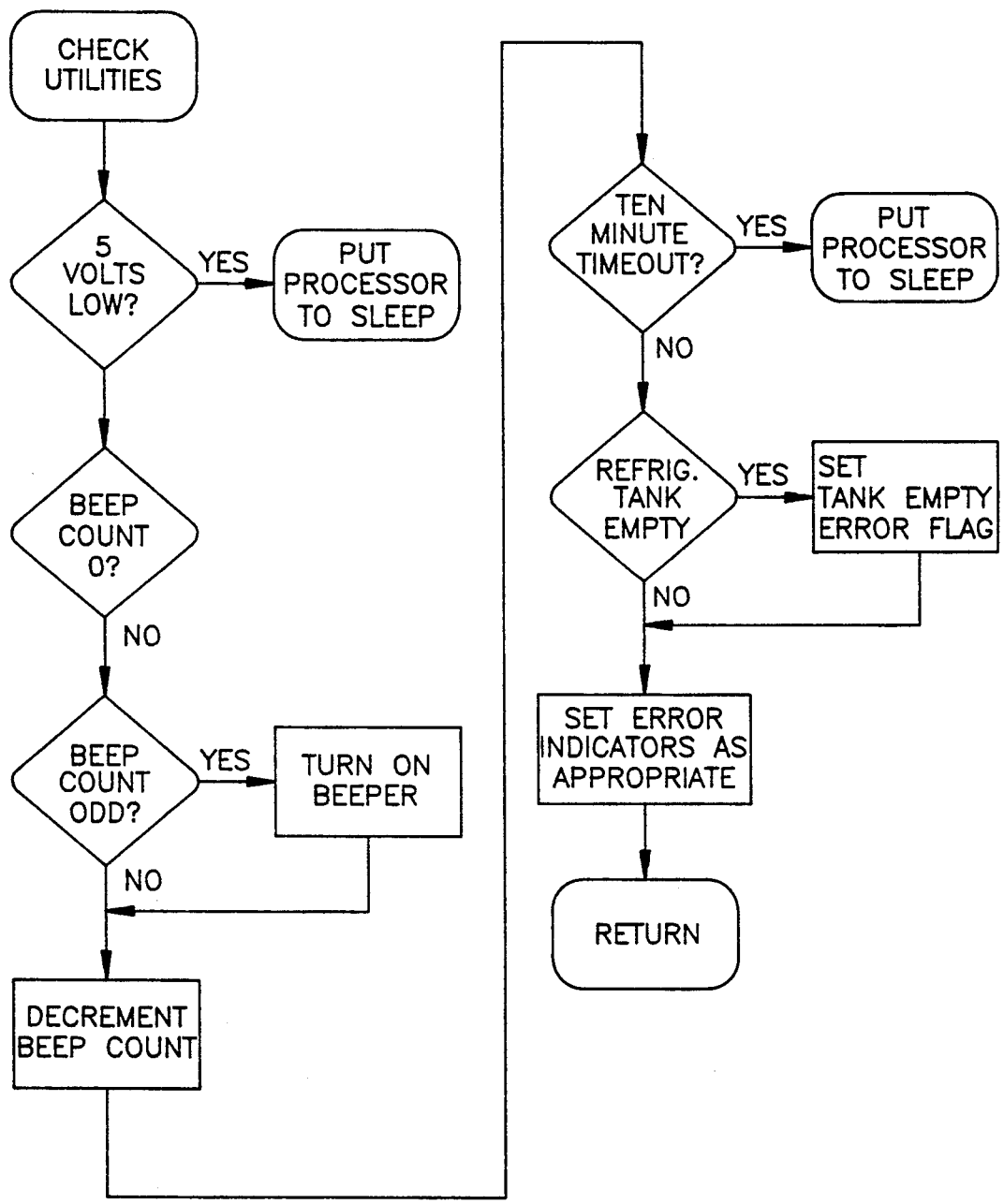
FIG. 7 is a flow chart of the check utilities subroutine of the computer program of FIG. 5.

Referring to FIG. 7, the check utilities subroutine is described. Upon entry to the check utilities subroutine, a determination is first made as to whether the five volt power supply voltage is two low. If so, microcontroller 90 is put to sleep, i.e., powered down to a quiescent state. If not, an internal beep counter in microcontroller 90 is checked to see if the beep count is zero. If it is, the subroutine branches to where it checks to determine if there has been a ten minute timeout. If not, the beep count is checked to see if it is odd. If not, buzzer 102 is turned off. If the beep count is odd, buzzer 102 (FIG. 4) is turned on. After buzzer 102 has been turned on or off as the case may be, the beep count is decremented. The subroutine next checks for a ten minute timeout, that is, that the pressure in the low pressure side of refrigerant system 12 has not changed or a switch of keyboard/display 16 has not been pressed for ten minutes. If so, microcontroller 90 is put to sleep. Next, the check utilities checks to determine if refrigerant supply tank 210 (FIG. 2) is empty. It does so by determining whether the pressure in the refrigerant supply tank 210 has dropped at or above a predetermined rate. If so, the refrigerant supply tank 210 is empty. In other words, if the rate of pressure decay in the refrigerant supply tank reaches a predetermined level, this is an indication that the refrigerant supply tank is empty. Applicants have determined that a rate of pressure decay about 10 psi/minute, or greater, works well as an indication that refrigerant tank 210 is empty. If the refrigerant supply tank 210 is determined to be empty, a refrigerant tank empty flag is set in the memory of microcontroller 90. This will cause microcontroller 90 to illuminate tank empty error indicator 40 at the appropriate time. After checking to determine if the refrigerant supply tank 210 is empty, the check utilities sets or resets error indicators 38, 40, 42, based on the status of their respective error flags in the memory of microcontroller 90. If refrigerant tank empty error indicator 40 is set or illuminated by microcontroller 90, or insufficient pressure drop pressure drop error indicator 42 is set or illuminated, the charging process is also terminated. The check utilities subroutine then returns to the main routine.

Figure 8:
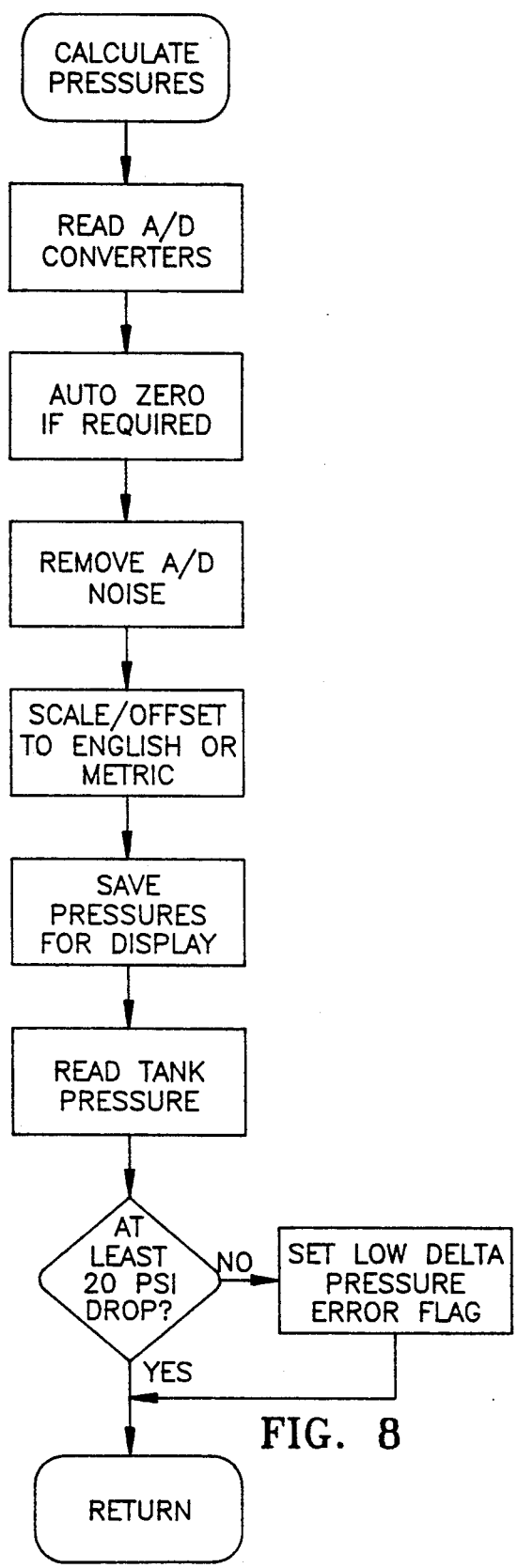
FIG. 8 is a flow chart of the calculate pressure subroutine of the computer program of FIG. 5.

Referring to FIG. 8, the calculate pressures subroutine is described. The calculate pressures subroutine determines the pressures in the high and low sides of refrigerant system 12. To do so, microcontroller 90 reads its internal A/D converters to which pressure transducers 76, 78 are coupled. That is, microcontroller 90 digitizes the analog signals at its analog inputs 94, 96 to which pressure transducers 76, 78 are respectively coupled. The internal analog/digital converter of microcontroller 90 is autozeroed if necessary, and the digitized values digitally filtered to remove noise. Next, the digitized values are scaled as appropriate for English or Metric. Jumper J9 (FIG. 12A) determines whether control system 10 will display in English or Metric units. The digitized pressure values are saved in microcontroller 90's memory for subsequent display. The pressure of the refrigerant supply tank 210 coupled to refrigerant supply port 204 (FIGS. 2 and 3) is next read by microcontroller 90 digitizing the analog signal at its analog input 92 to which tank pressure transducer 74 is coupled. The tank pressure is then compared to the low side pressure in refrigerant system 12. If it is not at least twenty p.s.i greater than the low side pressure in refrigerant system 12, the low delta pressure or insufficient pressure drop error flag is set. (In order for constant flow valve 68 to work properly, there must be at least a twenty p.s.i. drop across it.) This will cause error indicator 42 to be illuminated by the check utilities subroutine. The calculate pressure subroutine then returns to the main routine.

Figure 9:
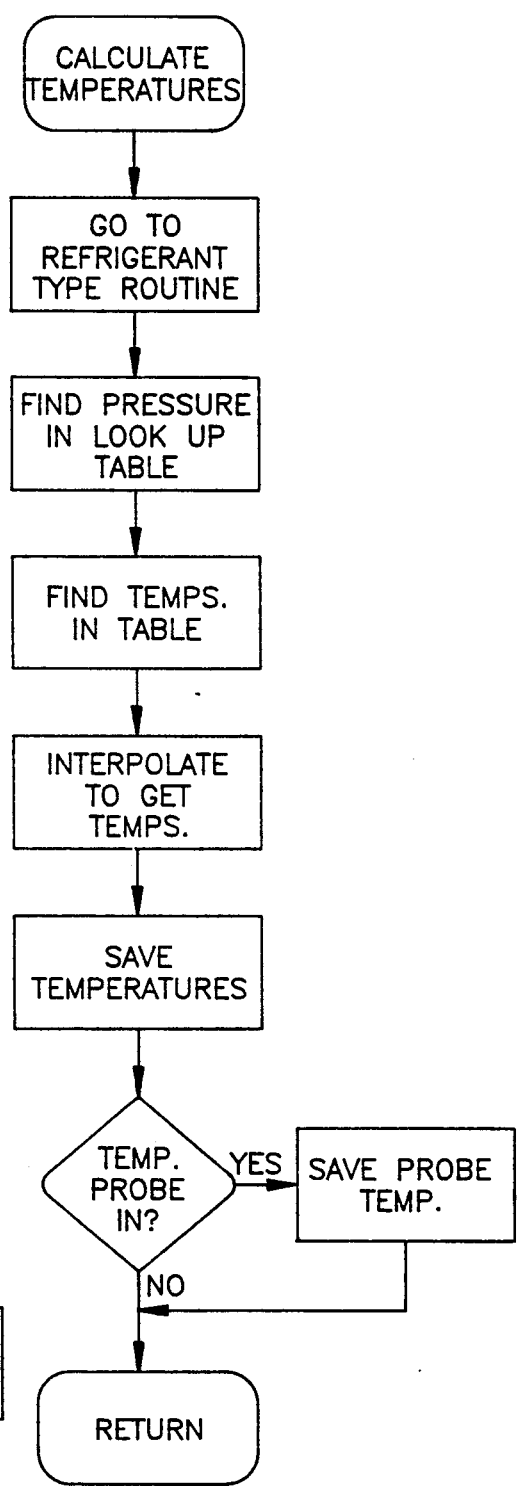
FIG. 9 is a flow chart of the calculate temperature subroutine of the computer program of FIG. 5.

Turning now to FIG. 9, the calculate temperatures subroutine is described. Upon entry to the subroutine, the type of refrigerant selected by the operator is checked and the calculate temperature subroutine selects the appropriate routine for the selected refrigerant type. Each refrigerant type has a routine which includes a look-up table stored in the memory of microcontroller 90 in which temperatures corresponding to pressures in ten degree increments are stored. As has been discussed previously, pressures in refrigerant systems are often expressed in terms of temperature and for each type of refrigerant there exist known temperature/pressure correlation tables which provided the source of the data in the look-up tables. Such tables can be found in standard reference works such as the American Society of Heating, Refrigerating, and Air Conditioning Engineers, *Handbook of Fundamentals*, (1972). Next, the closest entries in the look up table to the low and high side pressures are found and the temperatures in the look up table corresponding to those entries then found.

Since the look up table is in ten degree increments, a pressure will usually fall between two entries in the look up table. Therefore, the temperature corresponding to the low side pressure must be interpolated from the two entries in the look up table that the low side pressure falls between and the temperature corresponding to the high side pressure must be interpolated from the two entries in the look up table that the high side pressure falls between as indicated by the interpolate temperatures between two pressure values step. The high and low side temperatures are then saved. Next, the calculate temperature subroutine checks to see if temperature probe 100 is inserted in temperature probe jack 58. If it is, the subroutine saves the probe temperature and then returns to the main routine. If temperature probe 100 is not inserted in temperature probe jack 58, the calculate temperature subroutine returns to the main routine.

Figure 10A:
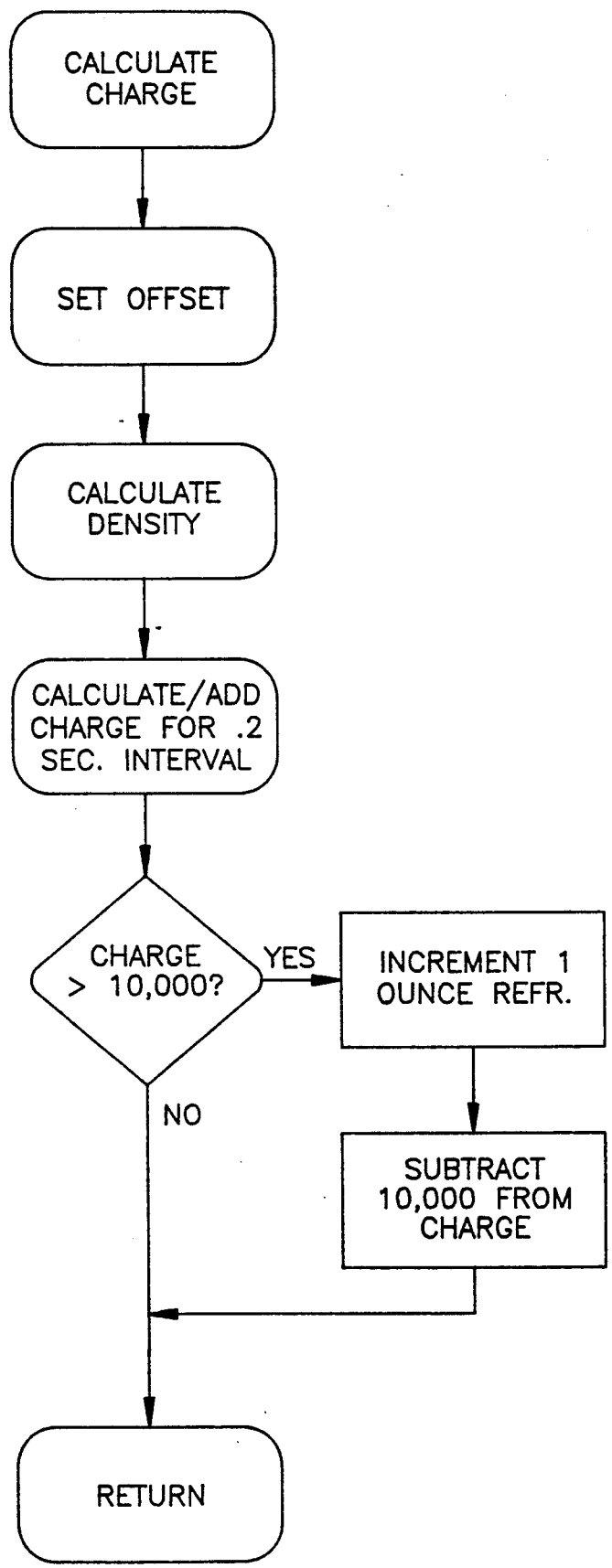
FIGS. 10A-10D are flow charts of the calculate charge subroutine of the computer program of FIG. 5.

Turning to FIGS. 10A–10D, the calculate charge subroutine is described. FIG. 10A is a flow chart showing an overview of the steps in the calculate charge subroutine which are described in more detail in FIGS. 10B–10D. First, the offset for the particular refrigerant type that has been selected is set. Each refrigerant type that can be selected has a table containing the charge constants for that refrigerant type that are used in calculating the charge. These constants are taken from standard reference works such as the ASHRE Handbook referenced above. As shown in Table 1, each table has four bytes.

TABLE 1

| CHARGE TABLE FORMAT | UNITS |
| --- | --- |
| 1 Byte - Density Curve Slope | Density |
| 2 Bytes - Density Curve Intercept | $10^{-4}$ oz./cc |
| 1 Byte - Flow Rate | (cc/.2 sec.) * 256 |

Figure 10B:
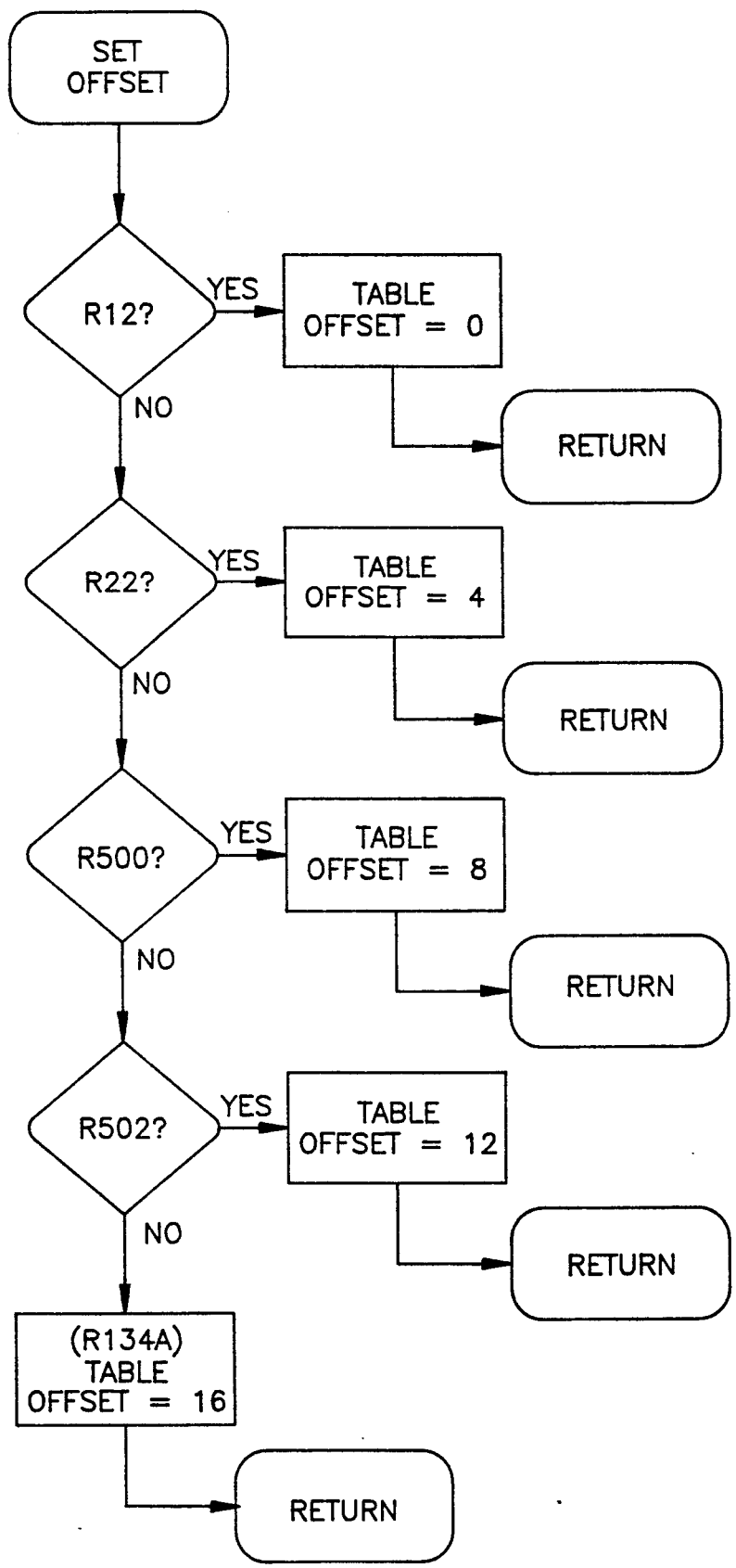

(The flow rate constant is multiplied by 256 to provide whole numbers for use in the calculations described below.) Illustratively, five refrigerant types can be selected, R12, R22, R500, R502, and R134a. As shown in FIG. 10B, the offsets are set to zero, four, eight, twelve, and sixteen when the refrigerant types are R12, R22, R500, R502, and R134a, respectively. Table 2 is the table of charge constants for these five refrigerants, given as decimal numbers.

TABLE 2

| REFRIGERANT | OFFSET | CHARGE CONSTANTS |
| --- | --- | --- |
| R12 | 0 | 136 |
|  |  | 507 |
|  |  | 229 |
| R22 | 4 | 90 |
|  |  | 471 |
|  |  | 244 |
| R500 | 8 | 110 |
|  |  | 453 |
|  |  | 220 |
| R502 | 12 | 117 |
|  |  | 502 |
|  |  | 198 |
| R134a | 16 | 141 |
|  |  | 473 |
|  |  | 213 |

After the offset for the selected refrigerant has been set, the density of the refrigerant is calculated using the equation $$DENSITY = MX + B$$

where M is the low side pressure of the refrigerant system 12 as determined by control system 10, X is the density curve slope for the selected refrigerant type taken from that refrigerant's table, and B is the density curve intercept taken from that refrigerant's table. As shown in more detail is FIG. 10C, the density is calculated by first setting a temporary value equal to the density curve slope value from the refrigerant's table (offset+0 table location) times the low side pressure. This value is then divided by 256. (The offset+0 table location ends up being the high order byte of a two byte word that microcontroller 90 uses as the multiplicand in the equation resulting in a product which is 256 times too high.) This value is then negated and the density calculated by adding to it the density curve slope intercept value from the refrigerant's table (offset+1 and offset+2 table locations).

Returning to FIG. 10A, after the density of the refrigerant has been determined, the amount of incremental charge of refrigerant that has flowed through constant flow valve 68 (FIG. 2) for a 0.2 second interval is determined. As described in more detail in FIG. 10D, the incremental charge amount is determined by multiplying the refrigerant's flow rate constant from the table for the selected refrigerant (offset+3 table location) by the density for the refrigerant which was just calculated and dividing this value by 256.

Referring back to FIG. 10A, after the incremental charge amount is calculated, it is added to the charge total. The charge total is then checked to see if it exceeds 10,000. If it does, the total ounces of refrigerant or freon charged is incremented and the charge total is decremented by 10,000. The charge subroutine then returns to the main routine as it does if the charge total is less than 10,000.

Figures 10C, 10D, 11:
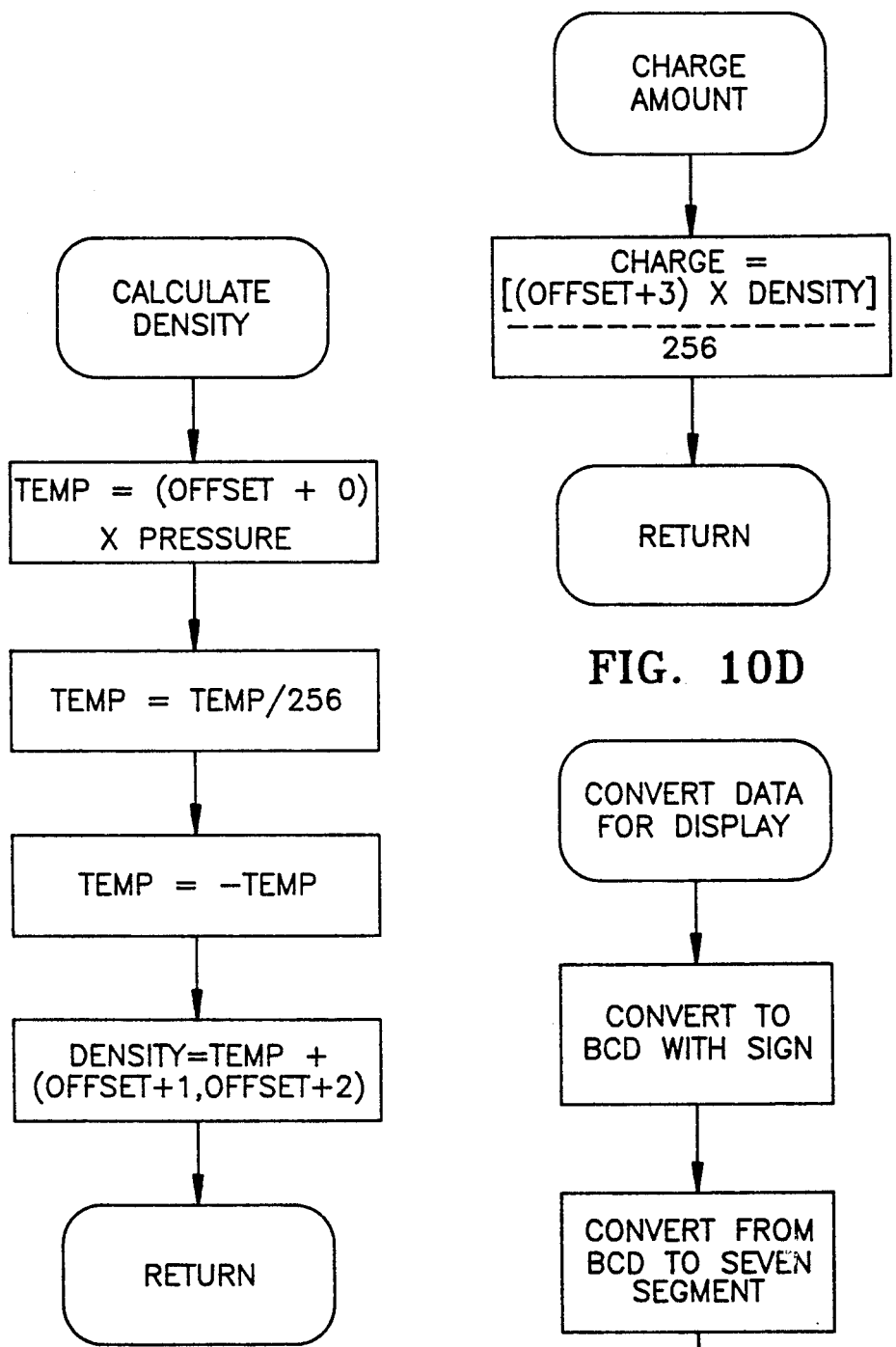
FIG. 11 is a flow chart of the convert data for display subroutine of the computer program of FIG. 5.

Referring to FIG. 11, the convert data for display subroutine is described. First, the data to be displayed is converted to BCD (binary coded decimal format) with sign format and the BCD format then converted to seven segment format. The subroutine then returns to the main routine. As discussed, when the internal interrupt counter is equal to thirty-two, the data which has been converted for the display is loaded into display/keyboard 16.

Figure 12A:
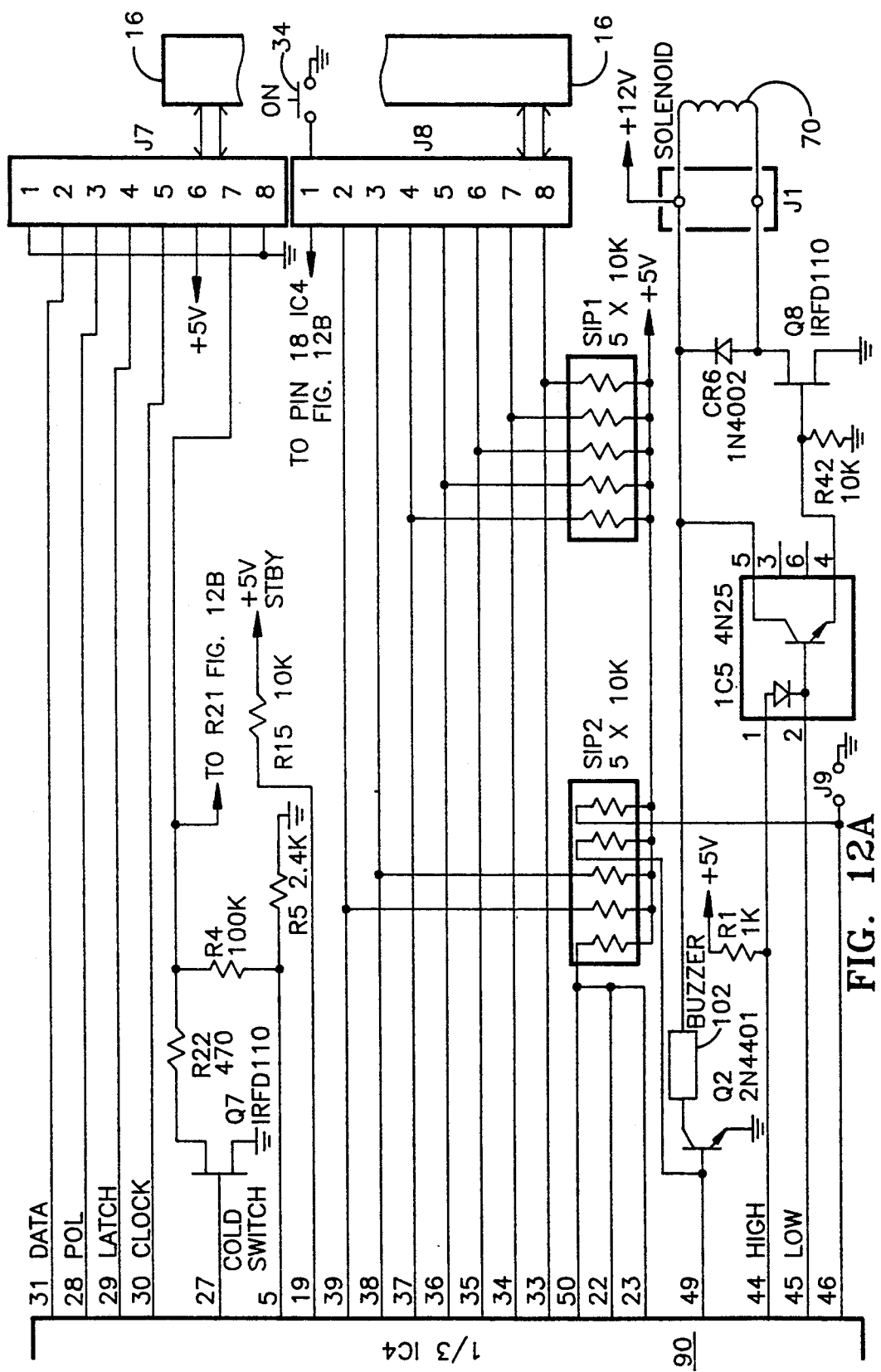
FIGS. 12A-12C are schematics of the electronic circuit of FIG. 4.
Figure 12B:
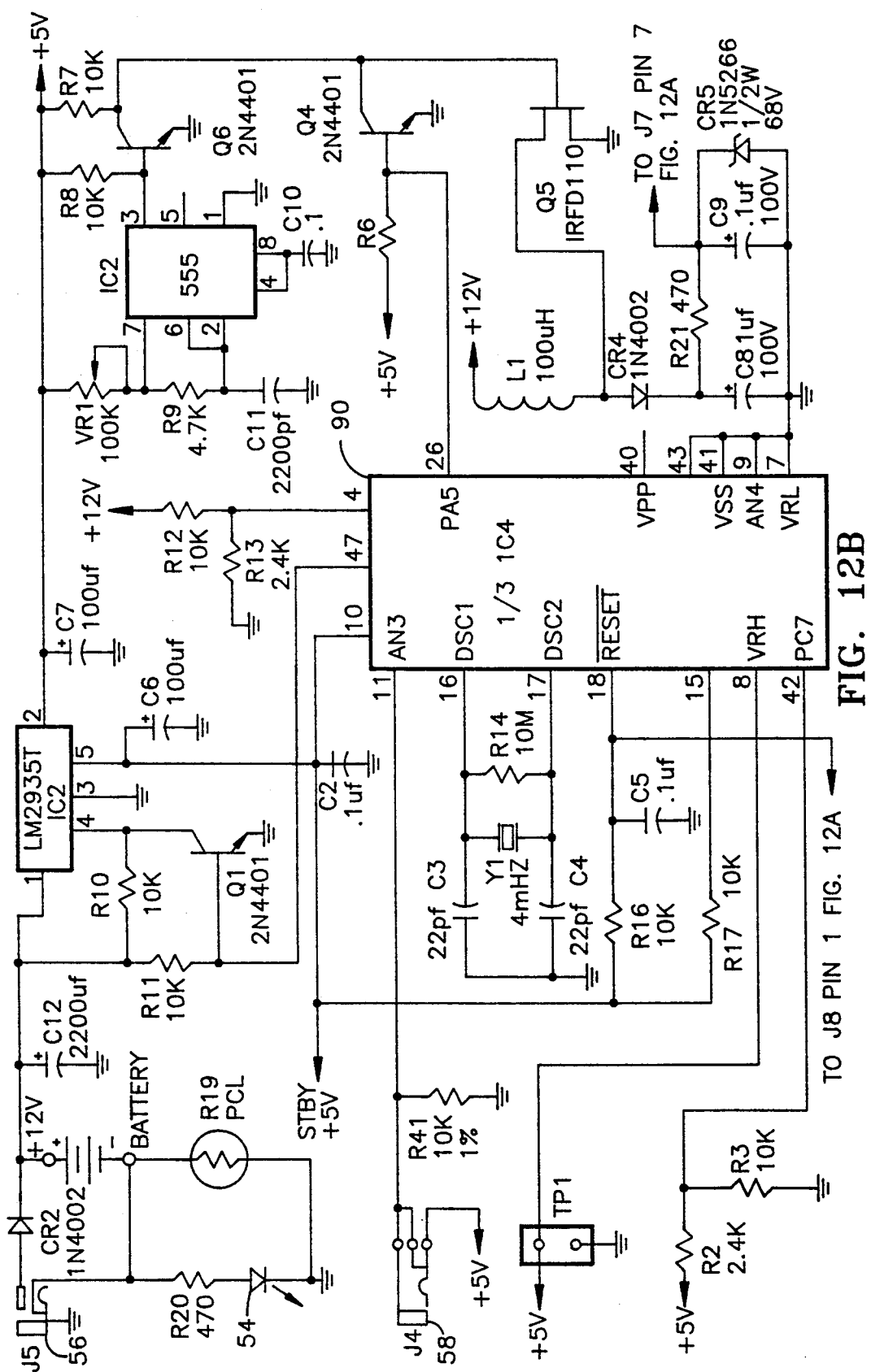
Figure 12C:
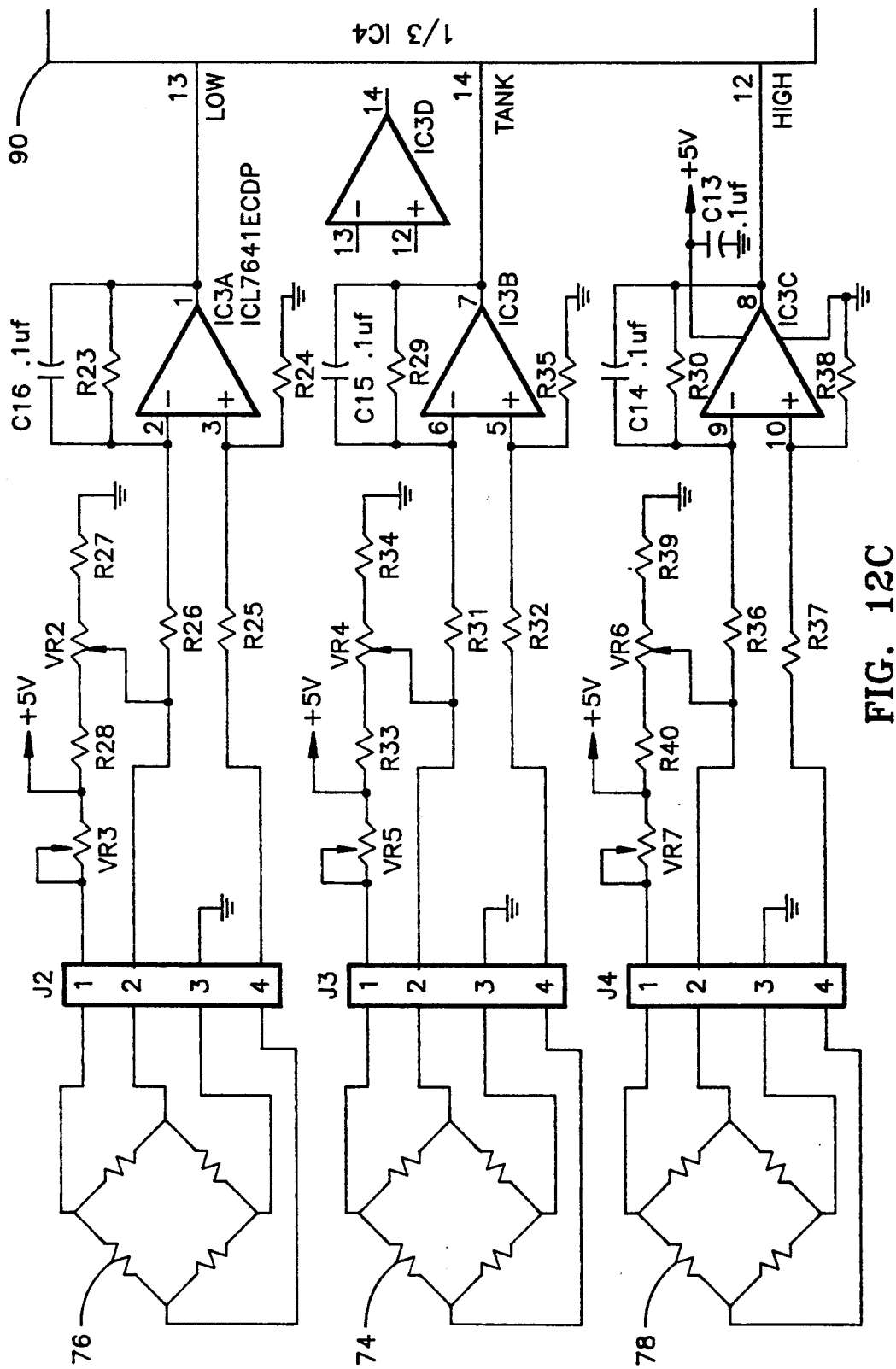

FIGS. 12A-12C are schematics of electronic control circuit 88 (FIG. 4) for the control system 10.

Although the invention has been described in detail with reference to certain preferred embodiments, materials and specific examples, variations and modifications exist within the scope and spirit of the invention as described and as defined in the following claims.

What is claimed is:

1. An apparatus for charging refrigerant into a refrigerant system, comprising:
   (a) a constant flow valve having an inlet for coupling to a source of refrigerant and an outlet port for coupling to an inlet of a refrigerant system;
   (b) means coupled to the outlet of the constant flow valve for determining the pressure at the inlet of the refrigerant system when the outlet of the constant flow valve is coupled thereto;
   (c) means for determining the density of the refrigerant being charged into the refrigerant system from the pressure determined at the inlet of the refrigerant system;
   (d) means for determining the volume of refrigerant that has flowed through the constant flow valve;
   (e) means for determining the mass of refrigerant charged into the refrigerant system based upon the volume of refrigerant that has flowed through the constant flow valve and the determined density of the refrigerant.

2. The apparatus of claim 1 and further including means coupled to the mass determining means for displaying the mass of refrigerant charged into the refrigerant system.

3. The apparatus of claim 2 and further including a valve coupled in series with the constant flow valve and means for opening and closing the valve to permit refrigerant to flow from the source of refrigerant through the constant flow valve into the refrigerant system and to shut off the flow of refrigerant from the source of refrigerant through the constant flow valve into the refrigerant system.

4. The apparatus of claim 1 and further including means for selecting the type of refrigerant to be charged into the refrigerant system from the source of refrigerant, the refrigerant density determining means including means for determining the density of the refrigerant from the type of refrigerant selected as well as the pressure of the refrigerant.

5. The apparatus of claim 4 wherein the means for determining the volume of refrigerant that has flowed through the constant flow valve includes means for determining the amount of time the refrigerant has flowed through the constant flow valve and determining the volume of the refrigerant that has flowed through the constant flow valve based upon the amount of time the refrigerant has flowed through the constant flow valve and the type of refrigerant selected.

6. An apparatus for charging refrigerant into a refrigerant system from a source of refrigerant, comprising:
   (a) an inlet port for coupling to the source of refrigerant and an outlet port for coupling to an inlet port of the refrigerant system;
   (b) a constant flow valve coupled in series between the inlet port and the outlet port of the apparatus;
   (c) control means for determining the mass of refrigerant charged into the refrigerant system based on the volume of refrigerant that flowed through the constant flow valve and the density of that refrigerant, the control means including means for determining the density of the refrigerant based on the pressure of the refrigerant at the outlet port of the apparatus and also including means for determining the volume of refrigerant that flowed through the constant flow valve; and
   (d) a pressure transducer coupled to the outlet port of the apparatus for sensing the pressure of the refrigerant and having an output coupled to an input of the control means.

7. The apparatus of claim 6 and further including refrigerant selection means coupled to an input of the control means for selecting the type of refrigerant which is supplied by the source of refrigerant, the control means including memory means for storing data related to density characteristics of refrigerant types that can be selected by the refrigerant selection means, the control means density determining means determining the density of the refrigerant from the pressure of the refrigerant at the outlet port of the apparatus and from the stored data for the refrigerant type selected by the refrigerant selection means.

8. The apparatus of claim 7 wherein data related to flow characteristics of each type of refrigerant that can be selected is stored in the control means' memory means and the means for determining the volume of refrigerant that has flowed through the constant flow valve includes means for determining the amount of time refrigerant has flowed through the constant flow valve and determining the volume of refrigerant based upon the amount of time refrigerant has flowed through the constant flow valve and the flow characteristics of the selected refrigerant.

9. The apparatus of claim 6 and further including means for displaying the amount of refrigerant that has flowed through the constant flow valve and means for coupling the display means to data outputs of the control means.

10. The apparatus of claim 7 and further including means for setting an amount of refrigerant to be charged into the refrigerant system, means for coupling the setting means to an input of the control means, a valve coupled in series with the constant flow valve between the inlet port and outlet port of the apparatus and opening and closing in response to valve control signals generated at an output of the control means by the control means, means for coupling the valve to the output of the control means at which the valve control signals are generated, the control means generating a first valve control signal to open the valve to cause refrigerant to flow through the apparatus and into the refrigerant system from the refrigerant source and generating a second valve control signal to close the valve to stop the flow of refrigerant through the apparatus when the amount of refrigerant that the control means determines has flown through the constant flow valve has reached the amount of refrigerant to be charged into the refrigerant system set by the refrigerant amount setting means.

11. The apparatus of claim 10 and further including charge mode setting means to select between a continuous charge mode and a charge to set amount mode, means for actuation by the operator for providing start and stop signals, means for coupling the start and stop signal providing means to the control means, and means for coupling the mode setting means to the control means whereby once a start signal is received by the control means from the start and stop signal providing means the apparatus continuously charges until a stop signal is received by the control means from the start and stop signal providing means if the charge mode setting means has selected the continuous charge mode and the apparatus charges until the amount of refrigerant set by said refrigerant amount setting means is reached if the charge mode setting means has selected the charge to set amount mode.

12. The apparatus of claim 7 wherein the refrigerant system has a low pressure port and a high pressure port, the low pressure port comprising the inlet port of the refrigerant system to which the outlet port of the apparatus is coupled to charge refrigerant into the refrigerant system from the refrigerant source through the apparatus, the apparatus having a high pressure port for coupling to the high pressure port of the refrigerant system and a second pressure transducer coupled to the high pressure port of the apparatus for sensing the pressure at the high pressure port of the refrigerant system and having an output coupled to a second analog input of the control means, the control means including means for determining the pressure at the high pressure port of the refrigerant system from the signal at its second analog input provided by the second pressure transducer, the control means further including means for outputting at data outputs digital data indicative of the pressures at the high and low ports of the refrigerant system, the apparatus further including pressure display means coupled to the data outputs of the control means for displaying the pressures at the high and low ports of the refrigerant system.

13. The apparatus of claim 12 and further including pressure/temperature mode selection means for selecting between a pressure display mode and a temperature display mode for the pressure display means, the control means having pressure/temperature data stored in its memory for each type of refrigerant that can be selected by the refrigerant selection means which correlates pressure with temperature for each refrigerant, the control means outputting on its data outputs digital data indicative of the high and low port pressures in pressure units when the pressure display mode has been selected the pressure display mode and in degrees when the temperature display mode has been selected whereby the control means determines the temperature data to be output from the pressure data and the stored pressure/temperature data for the selected refrigerant.

14. The apparatus of claim 7 and further including a vacuum/recovery port and a second valve coupling the vacuum/recovery port to the outlet port.

15. The apparatus of claim 6 and further including a second pressure transducer coupled to the inlet port and having an output coupled to the control means, the control means including means for comparing the pressure sensed by the second pressure transducer at the inlet port with the pressure sensed by the first recited pressure transducer at the outlet port and energizing an alarm coupled to the control means when the pressure at the inlet port does not exceed the pressure at the outlet port by a preset amount.

16. The apparatus of claim 10 wherein the source of refrigerant comprises a pressurized tank of refrigerant, the apparatus further including a second pressure transducer coupled to the inlet port and having an output coupled to the control means, the control means including means for monitoring the pressure sensed by the second pressure transducer at the inlet port and determining the rate at which the pressure at the inlet port is dropping and that the refrigerant tank is empty when the rate of pressure drop at the inlet port reaches a predetermined amount.

17. The apparatus of claim 16 wherein the control means includes means for terminating the charging of refrigerant through the apparatus when it determines the refrigerant tank is empty and for actuating an indicator coupled to an output of the control means to indicate that the refrigerant tank is empty.

18. An apparatus for charging refrigerant into a refrigerant system from a source of refrigerant, comprising:
(a) an inlet port for coupling to the source of refrigerant, a low pressure outlet port for coupling to a low pressure port of the refrigerant system and a high pressure port for coupling to a high pressure port of the refrigerant system;
(b) a constant flow valve coupled in series between the inlet port and the outlet port;
(c) a solenoid valve coupled in series with the constant flow valve between the inlet port and the outlet port;
(d) control means for controlling the flow of refrigerant through the apparatus and determining the amount of refrigerant charged into the refrigerant system;

(e) a first pressure transducer coupled to the outlet port and having an output coupled to the control means;

(f) a second pressure transducer coupled to the high pressure port of the apparatus and having an output coupled to the control means;

(g) refrigerant selection means for selecting the type of refrigerant being charged into the refrigerant system, the refrigerant selection means coupled to the control means;

(h) the control means having a memory for storing data related to density characteristics of refrigerant types that can be selected by the refrigerant selection means;

(i) the control means including means for determining the density of the refrigerant at the outlet port based on the pressure of the refrigerant at the outlet port, means for determining the volume of refrigerant that flowed through the constant flow valve and means for determining the mass amount of refrigerant that has been charged into the refrigerant system from the density of the refrigerant and the volume of refrigerant that has flowed through the constant flow valve;

(j) refrigerant amount display means coupled to the control means for displaying the amount of refrigerant that has been charged into the refrigerant system as determined by the control means;

(k) charge mode selecting means for selecting between a continuous charge mode and a charge to set amount mode, the charge mode selecting means coupled to the control means;

(l) refrigerant amount setting means coupled to the control means for setting an amount of refrigerant to be charged into the refrigerant system;

(m) means coupled to the control means for providing start and stop signals to the control means;

(n) the control means actuating the solenoid valve to open it upon receipt of a start signal to permit refrigerant to flow through the apparatus into the refrigerant system, the control means deactuating the solenoid valve to close it and stop refrigerant flowing through the apparatus into the refrigerant system upon receipt of a stop signal and when in the charge to set amount mode when the control means determines that the amount of refrigerant charged into the refrigerant system has reached the set amount.

19. The apparatus of claim 18 wherein data related to flow characteristics of each refrigerant that can be selected are stored in the control means' memory means and the means for determining the volume of refrigerant includes means for determining the amount of time that refrigerant has flowed through the constant flow valve and determining the volume of refrigerant based upon the determined time and the flow characteristics of the selected refrigerant.

20. The apparatus of claim 19 and further including means for displaying the pressures at the high and low pressure ports of the refrigerant system, the control means determining the high and low pressures at the high and low pressure ports of the refrigerant system from the signals received from the first and second pressure transducers and displaying the determined pressures on the pressure display means.

21. The apparatus of claim 20 wherein the control means' memory has pressure/temperature data stored in it for each type of refrigerant that can be selected by the refrigerant type selection means which correlates pressure with temperature for each refrigerant, the apparatus further including pressure/temperature mode selection means coupled to the control means for selecting between a pressure display mode and a temperature display mode for the pressure display means, wherein the control means displays the high and low port pressures of the refrigerant system on the pressure display means in pressure units when in the pressure display mode and in temperature units when in the temperature display mode.

22. The apparatus of claim 18 wherein the source of refrigerant comprises a pressurized tank of refrigerant, the apparatus further including a second pressure transducer coupled to the inlet port and having an output coupled to the control means, the control means including means for monitoring the pressure sensed by the second pressure transducer at the inlet port and determining the rate at which the pressure at the inlet port is dropping and that the refrigerant tank is empty when the rate of pressure drop at the inlet port reaches ten p.s.i/minute, the control means including means for terminating the charging of refrigerant through the apparatus when it determines the refrigerant tank is empty and for actuating an indicator coupled to an output of the control means to indicate that the refrigerant tank is empty.

23. In an apparatus for charging refrigerant into a refrigerant system having a constant flow valve through which the refrigerant flows wherein the volume of refrigerant charged into the refrigerant system is determined based on the amount of time refrigerant flowed through the constant flow valve, a method of determining the mass amount of refrigerant charged into the refrigerant system comprising the steps of:

(a) measuring the pressure of the refrigerant as it is charged into the refrigerant system;

(b) determining the density of the refrigerant from the measured pressure; and (c) determining the mass amount of refrigerant charged into the refrigerant system based on the determined volume of refrigerant and determined density of the refrigerant.

24. The method of claim 23 wherein the volume of refrigerant charged into the refrigerant system, the density of the refrigerant, and the mass amount of refrigerant charged into the refrigerant system are determined at periodic time intervals, a total mass amount of refrigerant charged into the refrigerant system determined by accumulating the mass amount of refrigerant determined at each periodic time interval.

25. The method of claim 24 and further including the steps of prestoring data related to density and flow characteristics of each refrigerant that can be charged into the refrigerant system with the apparatus in a memory of the apparatus, selecting the type of refrigerant being charged into the refrigerant system, and determining the density of the refrigerant based on density characteristics of the selected refrigerant and the measured pressure and determining the volume of refrigerant that has flowed through the constant flow valve based on the amount of time refrigerant has flowed through the constant flow valve and the flow characteristics of the selected refrigerant.

26. The method of claim 25 wherein the apparatus includes a display for displaying the amount of refrigerant charged into the refrigerant system and the measured pressure, the method further including the steps of displaying on the display the amount of refrigerant charged into the refrigerant system and the measured pressure.

27. The method of claim 26 and further including the steps of selecting between a pressure mode and a temperature mode for displaying the measured pressure, displaying the measured pressure in pressure units when in the pressure mode, and correlating the measured pressure to temperature and displaying the measured pressure in temperature units when in the temperature mode.

28. A hand carried apparatus for controlling the charging of refrigerant into a refrigerant system, comprising:
   (a) a case adapted to be hand carried;
   (b) a manifold mounted in the case;
   (c) a controller mounted in the case;
   (d) the manifold having an inlet for coupling to a pressurized refrigerant tank and an outlet for coupling to a low pressure port of the refrigerant system and a high pressure port for coupling to a high pressure port of the refrigerant system;
   (e) a constant flow valve mounted to the manifold in series between the manifold's inlet and outlet;
   (f) a solenoid valve mounted to the manifold in series between the manifold's inlet and outlet;
   (g) a first pressure transducer mounted to the manifold and coupled to the manifold's inlet, the first pressure transducer providing an electrical signal at an output indicative of the pressure of refrigerant at the manifold's inlet, the first pressure transducer's output coupled to the controller;
   (h) a second pressure transducer mounted to the manifold and coupled to the manifold's outlet, the second pressure transducer providing an electrical signal at an output indicative of the pressure of refrigerant at the manifold's outlet, the second pressure transducer's output coupled to the controller;
   (i) a third pressure transducer mounted to the manifold and coupled to the manifold's high pressure port, the third pressure transducer providing an electrical signal at an output indicative of the pressure of refrigerant at the manifold's high pressure port, the third pressure transducer's output coupled to the controller;
   (j) means coupled to the controller for setting an amount of refrigerant to be charged into the refrigerant system;
   (k) means coupled to the controller for providing a start input to the controller to start the charging of refrigerant into the refrigerant system;
   (l) means coupled to the controller for causing the controller to select a type of refrigerant to be charged into the refrigerant system from a plurality of refrigerant types;
   (m) the controller including
      (i) a memory having data stored therein related to characteristics of the plurality of refrigerant types that can be selected by the refrigerant type selecting means;
      (ii) means for periodically determining the pressures at the manifold's inlet, the manifolds' outlet, and the manifold's high pressure port as sensed by the first, second, and third pressure transducer, respectively, from the electrical signals provided by the first, second, and third pressure transducer;
      (iii) means for determining the density of the refrigerant at the manifolds' outlet from the pressure of the refrigerant at the manifold's outlet and the stored data related to the characteristics of the selected refrigerant type;
      (iv) means for determining the volume of refrigerant that has flowed through the constant flow valve;
      (v) means for determining the mass amount of refrigerant that has been charged into the refrigerant system from the determined volume and density of the refrigerant at the manifold's outlet;
      (vi) means responsive to the start input for energizing the solenoid valve to start refrigerant flowing from the refrigerant tank into the manifold's inlet and through the solenoid valve and constant flow valve and out of the manifold's outlet and into the low pressure port of the refrigerant system;
      (vii) means for comparing the mass amount of refrigerant charged into the refrigerant system with the set amount and deenergizing the solenoid valve to terminate the charging of refrigerant into the refrigerant system when the mass amount of refrigerant charged into the refrigerant system reaches the set amount;
      (viii) means for periodically determining a rate of pressure drop at the manifold's inlet and comparing the determined rate of pressure drop to a predetermined rate and determining that the refrigerant tank is empty when the determined rate of pressure drop reaches the predetermined rate and deenergizing the solenoid valve to terminate the charging of refrigerant into the refrigerant system when the refrigerant tank is determined to be empty;
   (n) means coupled to the controller for displaying the mass amount of refrigerant charged into the refrigerant system;
   (o) means coupled to the controller for displaying the pressure of refrigerant at the manifold's outlet as determined by the controller; and
   (p) means coupled to the controller for displaying the pressure of refrigerant at the manifold's high pressure port as determined by the controller.

29. An apparatus for charging refrigerant into a refrigerant system, comprising
   (a) valve means for controllably coupling a source of refrigerant to the refrigerant system, the valve means having an inlet coupled to the refrigerant source and an outlet coupled to the refrigerant system;
   (b) a controller having a memory in which is stored data related to characteristics of a plurality of refrigerant types;
   (c) means coupled to the controller for selecting one of the plurality of refrigerant types for which data is stored in the controller's memory, said selected refrigerant type being the type of refrigerant provided by the refrigerant source;
   (d) the controller including means for determining the amount of refrigerant that flows through the valve means and determining the amount of refrigerant charged into the refrigerant system from the determined amount of refrigerant that has flowed through the valve means and the stored data related to characteristics of that refrigerant;

(e) and means for coupling the controller to the valve means.

30. The apparatus of claim 29 wherein the valve means includes a constant flow valve through which the refrigerant flows, the data stored in the controller's memory related to the characteristics of the plurality of refrigerants including data related to flow characteristics of the plurality of refrigerants, the controller's means for determining the amount of refrigerant that has flowed through the valve means including means for determining the amount of time refrigerant has flowed through the constant flow valve and determining the volume of refrigerant that has flowed through the valve means based on the determined amount of time that refrigerant has flowed through the constant flow valve and the stored data related to the flow characteristics of the selected refrigerant.

31. The apparatus of claim 30 wherein the stored data includes data relating pressures to density for each of the selected refrigerant, the apparatus further including a pressure transducer coupled to the outlet of the valve means for sensing the pressure of the refrigerant thereat and providing an electrical signal related thereto to the controller, means for coupling the pressure transducer to the controller, the controller including means for determining the pressure of the refrigerant at the outlet of the valve means from the electrical signal provided by the pressure transducer and also including means for determining the density of the refrigerant at the outlet of the valve means from the determined pressure and the stored density data for the selected refrigerant, the controller's means for determining the amount of refrigerant charged into the refrigerant system including means for determining the mass amount of refrigerant charged from the determined volume and determined density.

32. The apparatus of claim 31 wherein the valve means includes a solenoid valve coupled in series between the valve means' inlet and outlet, means for coupling the solenoid valve to the controller, means coupled to the controller for setting an amount of refrigerant to be charged into the refrigerant system, means coupled to the controller and responsive to an operator for providing a signal to the controller to start the charging of refrigerant into the refrigerant system, the controller including means responsive to the start signal for energizing the solenoid valve to cause it to open thereby allowing refrigerant to flow through the valve means, the controller's mass amount determining means including means for periodically determining the cumulative mass amount of refrigerant charged into the refrigerant system, the controller further including means for comparing the cumulative mass amount of refrigerant charged into the refrigerant system with the set amount and deenergizing the solenoid valve to cause it to close to block the flow of refrigerant through the valve means when the cumulative mass amount reaches the set amount.

33. The apparatus of claim 32 wherein the source of refrigerant comprises a pressurized tank of refrigerant, the apparatus further including a second pressure transducer coupled to the inlet of the valve means for sensing the pressure of refrigerant at the valve means' inlet and providing an electrical signal related thereto to the controller, means for coupling the second pressure transducer to the controller, the controller including means for periodically determining the pressure of refrigerant at the valve means' inlet from the electrical signal provided by the second pressure transducer and determining a rate of pressure drop therefrom, the controller further including means coupled to the rate of pressure drop determining means for determining that the refrigerant tank is empty when the rate of pressure drops reaches a predetermined level and causing the controller's solenoid valve deenergizing means to deenergize the solenoid valve when the refrigerant tank is determined to be empty.

* * * * *